(12) United States Patent
Graf et al.

(10) Patent No.: US 6,766,238 B2
(45) Date of Patent: Jul. 20, 2004

(54) CONTROLLER FOR THE DRIVE TRAIN OF A MOTOR VEHICLE

(75) Inventors: Friedrich Graf, Sinzing (DE); Frank Lohrenz, Regensburg (DE); Ernst Nock, Tettnang (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/058,492

(22) Filed: Jan. 28, 2002

(65) Prior Publication Data

US 2002/0160877 A1 Oct. 31, 2002

Related U.S. Application Data

(63) Continuation of application No. PCT/EP00/07080, filed on Jul. 24, 2000.

(30) Foreign Application Priority Data

Jul. 26, 1999 (EP) .............................................. 99114644

(51) Int. Cl.[7] .................................................. G06F 7/00
(52) U.S. Cl. ........................................................ 701/54
(58) Field of Search ........................ 701/51–54, 55–56, 701/64; 477/54, 43, 80, 74, 93, 98, 109–110, 169, 155, 107, 156, 114, 900, 901

(56) References Cited

U.S. PATENT DOCUMENTS 5,109,818 A * 5/1992 Yoshida ...................... 123/319

6,144,911 A * 11/2000 Binz et al. ..................... 701/51

FOREIGN PATENT DOCUMENTS

| DE | 197 25 149 A1 | 12/1997 | |
|---|---|---|---|
| DE | 197 27 044 A1 | 2/1999 | |
| DE | 198 02 075 A1 | 7/1999 | |
| EP | 0 454 504 A2 | 10/1991 | |
| EP | 0 518 855 B1 | 12/1992 | |
| EP | 0 532 363 A2 | 3/1993 | |
| EP | 0 576 703 B1 | 1/1994 | |
| EP | 0 719 966 A1 | 7/1996 | |
| JP | 11-22814 | * 1/1999 | .......... G16H/61/02 |

OTHER PUBLICATIONS

Fischer, R. et al.: "Automatisierung von Schaltgetrieben" (automation of gearboxes), LUK, Mar. 20, 1998.
Graf, F. et al.: "Advanced Transmission Control with Fuzzy Logic", ATA, Mar. 1995, pp. 378–389.

* cited by examiner

Primary Examiner—Thu Nguyen
(74) Attorney, Agent, or Firm—Laurence A. Greenberg; Werner H. Stemer; Ralph E. Locher

(57) ABSTRACT

A drive train controller of a motor vehicle has an engine controller for controlling the variables that influence the torque of the engine. The drive train controller also includes a transmission controller for controlling the gear shift operations of the automatic transmission. The transmission controller includes a detection circuit for determining the respective driving situation of the motor vehicle. The transmission controller changes the transmission ratio in a manner that is adaptively matched to the dynamics of the determined driving situation and/or the driver characteristics.

12 Claims, 3 Drawing Sheets

CONTROLLER FOR THE DRIVE TRAIN OF A MOTOR VEHICLE

CROSS-REFERENCE TO RELATED APPLICATION

This application is a continuation of copending International Application No. PCT/EP00/07080, filed Jul. 24, 2000, which designated the United States.

BACKGROUND OF THE INVENTION

Field of the Invention

The invention relates to a controller for the drive train of a motor vehicle (drive train controller).

In a known drive train controller, the transmission controller transmits, to the engine controller, a data element specifying the amount by which the (uncorrected) engine torque that is applied to the input shaft of the transmission is to be changed. In this context, this uncorrected engine torque is known to the transmission controller because the transmission controller either calculates the uncorrected engine torque itself or the uncorrected engine torque is transmitted to it by the engine controller via a communications line (See, for example, European Patent EP 0 518 855 B1). The transmission controller does not need to contain any engine-specific data in this context to convert a torque reduction into an ignition intervention, or into an intervention in the injection or the valve control. The conversion is carried out in the engine controller. As a result, the necessary variants of the transmission controller are considerably reduced.

In another modern drive train controller, only physically dimensioned descriptive variables that relate to the necessary engine torque reduction are exchanged between the transmission controller and the engine controller via an interface (See, For example, Published German Patent Application DE 197 27 044 A1). The transmission controller determines the behavior of the engine system on the basis of a generalized model. The model describes the behavior that is requested of the transmission controller at the limits of the engine/transmission system (engine output shaft) in a uniquely defined way without reference to the technical implementation in the engine system. The practical execution of an intervention in the engine is the sole responsibility of the engine controller. The engine controller defines whether an ignition intervention has to take place, whether the quantity of injected fuel is reduced, whether the valve control times or the valve characteristics have to be changed, or whether the engine is to be controlled by the throttle valve. The engine controller alone controls all of the actuators that are necessary for this. The dynamics of a change in the transmission ratio are not influenced in the known transmission and drive train controllers.

Published European Patent Application EP 0 719 996 A discloses a control method for the drive unit of a vehicle in which various operating parameters corresponding to the driving states are determined in a first stage. In a second stage, a first numerical value, which provides the gear speed with the lowest fuel consumption, and a second numerical value, which corresponds to the gear speed with the maximum power, are calculated. In a third stage, an optimized gear speed is defined on the basis of a function of the first and the second numerical value and in dependence on the operating parameters.

SUMMARY OF THE INVENTION

It is accordingly an object of the invention to provide a drive train controller which overcomes the above-mentioned disadvantages of the prior art apparatus of this general type.

In particular, it is an object of the invention to provide a transmission and a drive train controller that takes into account the dynamics of a change in the transmission ratio.

With the foregoing and other objects in view there is provided, in accordance with the invention, a drive train controller of a motor vehicle having an automatic transmission and an engine. The drive train controller includes: an engine controller for controlling variables that influence the torque of the engine; and a transmission controller for controlling gear shifting operations of the automatic transmission. The transmission controller exchanges data with the engine controller. This data enables the gear shifting operations to be performed comfortably. The drive train controller also includes a gear shift change controller for correcting a requested engine torque during a gear shifting operation. The transmission controller includes a detection circuit for determining a driving situation of the motor vehicle. The transmission controller adaptively matches changes in the transmission ratio to the dynamics of the driving situation that has been determined or the driver characteristics that have been determined.

In accordance with an added feature of the invention, a gear shift controller is provided that is embodied as a fuzzy logic circuit. The gear shift controller defines a gear shift strategy of a drive train of the motor vehicle.

In accordance with an additional feature of the invention, the detection circuit is a component of the gear shift controller.

In accordance with another feature of the invention, a clutch controller is provided that receives information from the gear shift controller. This information relates to a respective driving strategy and to the driving situation.

In accordance with a further feature of the invention, a line connects the gear shift change controller to the clutch controller to coordinate the clutch controller with a gear shift operation.

In accordance with a further added feature of the invention, a plurality of transmission actuators are connected to the gear shift change controller. The plurality of the transmission actuators are either electromechanical transmission actuators or electrohydraulic transmission actuators.

In accordance with a further additional feature of the invention, the gear shift change controller engages a new gear speed and synchronizes the transmission with low forces when changing from an idling position of the transmission into a driving position of the transmission.

In accordance with a yet an added feature of the invention, the gear shift controller executes a fuzzy logic program including: a first rule set that uses values selected from the group consisting of mean values of sensor signals and filtered values of sensor signals; and a second rule set for detecting rapid changes in a driving performance request.

The drive train controller of a motor vehicle having an engine and an automatic transmission is provided with an engine controller that controls the variables that influence the torque of the engine are controlled. The drive train controller is also provided with a transmission controller that controls the gear shift operations of the automatic transmission and that exchanges the data, which makes comfortable gear shift operations possible, with the engine controller. In this context, the transmission controller has a detection circuit that determines the respective driving situation of the motor vehicle. The transmission controller performs changes in the transmission ratio, which are adaptively matched to the determined driving situation.

The detection of driving situations is expediently carried out with a detection circuit that is embodied as a fuzzy logic circuit. Advanced transmission controls are frequently provided with fuzzy logic components (See, for example, F. Graf and H. Weil: Advanced Transmission with Fuzzy Logic, 3rd International Conference, Bologna, Mar. 29–31, 1995, Technical Papers pp. 379–389; and EP 0 576 703 A1) and can therefore easily be equipped with such a driving situation detection means. The advantages of the invention lie above all in the improvement in the driving comfort and in the driving safety of a motor vehicle in a wide range of driving situations. In the case of gear shift operations from a stationary state, for example, where there is a change from the idling of the transmission into a driving position—or even in the case of gear shifts during slow driving, gear shift noises, which are otherwise usual and troublesome, are effectively avoided.

Other features which are considered as characteristic for the invention are set forth in the appended claims.

Although the invention is illustrated and described herein as embodied in a controller for the drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The dynamics of a change in the transmission ratio in the transmission of a drive train controller of a motor vehicle depends on the control of the engine, the clutch position, and the movement of the actuator in the transmission. In order to increase the driving comfort and the driving safety, these dynamics must be taken into account when controlling the drive train with regard to various driving situations and different driver characteristics or driving styles. This is advantageously achieved by virtue of the fact that the transmission controller has a detection circuit that detects the respective driving situation of the motor vehicle, and that changes in the transmission ratio that are adaptively matched to the detected driving situation are carried out by the transmission controller.

Figure 1:
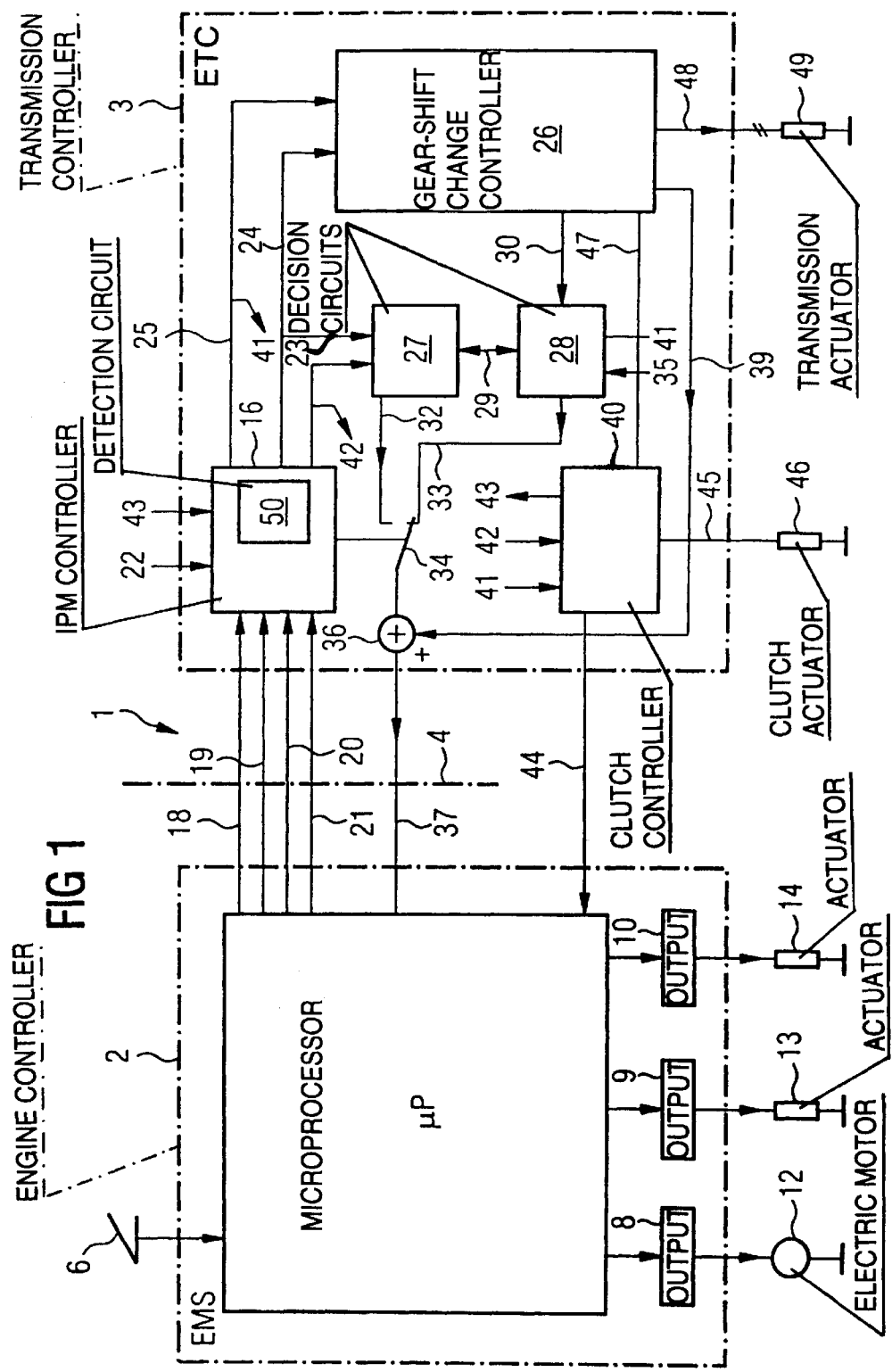
FIG. 1 shows a drive train controller.

Referring now to the figures of the drawing in detail and first, particularly, to FIG. 1 thereof, there is schematically shown a drive train controller 1 of a motor vehicle. The drive train controller 1 contains an electronic engine controller (abbreviated to EMS) 2 and an electronic transmission controller (ETC) 3 which communicate with one another, via an interface 4, by exchanging data relating to operating variables of the motor vehicle and control signals, in particular, in the form of physical descriptive variables.

The engine controller 2 receives signals from an accelerator pedal 6. The engine controller 2 has three control signal outputs: a signal output 8 for the throttle valve, a signal output 9 for the fuel injection, and a signal output 10 for controlling the ignition angle of an engine (not illustrated here in more detail) of a motor vehicle. The signal output 8 controls an electric motor 12 that activates the throttle valve of the motor vehicle. The signal outputs 9 and 10 control actuators 13 and 14 (which are embodied, for example, as piezoelectric or inductive actuators) that set the quantity of fuel to be injected and the ignition angle of the engine.

The transmission controller 3 contains the following components: a gear shift controller or IPM (Integrated Powertrain Management) controller 16 that carries out integrated controlling of the drive train and in particular defines the gear shift strategy. The IPM controller 16 receives data, relating to various values of the engine torque, from the engine controller 2 via lines 18, 19 and 20. The IPM controller 16 receives information, via line 21, relating to the desired engine torque that is predefined by the driver of the motor vehicle, or receives information relating to the position of the accelerator pedal 6.

The IPM controller 16 receives the respective output speed of the transmission, via line 22. This speed corresponds to the rotational speed of the wheels, and thus—in a predefined ratio—to the velocity of the motor vehicle. The IPM controller 16 transmits a target gear speed to be set or a target transmission ratio, via a branching signal line 23, 24, to a gear shift change controller 26 and to a first decision circuit 27, as well as to a second decision circuit 28. These two decision circuits are connected to one another by a bidirectional line 29.

All of the relevant information relating to the driving strategy and to the respective driving situation are fed, via line 25, to the gear shift change controller 26. The gear shift change controller 26 transmits control signals to the second decision circuit 28 via a line 30. These control signals control, for example, the derivative over time of the engine torque, i.e. the rate at which the engine torque is reduced.

One signal output of each of the first and second decision circuits 27, 28 are connected, via signal lines 32 and 33, to terminals of a switch 34. The switch 34, which is controlled by the IPM controller 16, connects either the output of the first decision circuit 27 or the output of the second decision circuit 28 to an adder 36. The output of the adder 36 is connected, via line 37, to the engine controller 2, i.e. in particular to a microprocessor $\mu P$ of the engine controller 2. The transmission controller 3 transmits the requested engine torque to the engine controller 2 via the line 37. A timing clock for controlling the transmission controller 3 separately from the engine controller 2 is applied to the second decision circuit 28 via line 35. A line 39 connects an output of the gear shift change controller 26 to an input of the adder 36.

The engine torque that is requested by the driver is applied to an input, characterized by "+", of the adder 36. This engine torque, which is referred to as the driver's desired torque, is corrected outside of a gear shift operation by the IPM controller 16. During a gear shift operation, the driver's desired torque is corrected by the gear shift change controller 26. The switch 34 thus distinguishes between the control outside of a gear shift operation and the control within or during a gear shift operation.

A clutch controller 40 receives all of the relevant information relating to the driving strategy and to the respective driving situation from the IPM controller 16 via a line 41 that branches off from the line 25. A clutch controller 40 receives information relating to the target position of the clutch, which is required when the motor vehicle is started up, via a line 42. The clutch controller 40 transmits an output signal to the IPM controller 16 via a line 43. The clutch controller 40 receives information relating to the respective driving strategy and driving situation via the line 41. The clutch controller 40 receives, via the line 42, information relating to the target position of the clutch and to the transmitted engine torque, which is important, for example, when starting up. The clutch controller 40 transmits the actual clutch position to the engine controller 2 via the output line 44.

The line 41 is also connected to the second decision circuit 28 so that all of the relevant information relating to the driving strategy and to the respective driving situation are also fed to the second decision circuit 28. Only the course of the (signal) lines 41 and 42 is indicated in FIG. 1 for the sake of better clarity.

A control line 45 connects the clutch controller 40 to a clutch actuator 46 that controls the clutch (not illustrated here) of the drive train 1. The clutch is controlled in coordination with the gear shift operation (in an automated manual gear shift transmission or AMT transmission) using a line 47 that connects the gear shift change controller 26 to the clutch controller 40.

A plurality of control lines 48 connect the gear shift change controller 26 to electromechanical or electro-hydraulic transmission actuators 49 which carry out the gear speed changes in the transmission (not illustrated here either) by actuating shift forks of the transmission in a known manner. These transmission actuators convert the control instructions into longitudinal and rotary movements of the shift forks. A rotary movement is used to select the gate arm, and a longitudinal movement is used to engage or disengage a gear speed. Details of the clutch actuation and of the gear speed actuators in the transmission are known per se (see, for example, R. Fischer and R. Berger (LUK), Automatisierung von Schaltgetrieben [Automating gear shift transmissions], in the report of the VDI Conference "Getriebe und Fahrzeuge" [Transmissions and vehicles], Mar. 19–20, 1998, pp. 95 et seq.).

The transmission controller 3 is provided with a detection circuit 50 that is used to detect the respective driving situations of the motor vehicle, for example: accelerated, uniform or decelerated driving, uphill driving or downhill driving, cornering, driving within a built-up area, on country roads or highways, driving in winter conditions, etc. In the present exemplary embodiment, the detection circuit 50 is embodied as a fuzzy logic computer or regulator and is a component of the IPM controller 16. The detection circuit 50 evaluates sensor signals that are already present in the transmission controller 3, as is explained in the contribution cited at the beginning by F. Graf and H. Weil and in the aforesaid patent application EP 0 576 703 A1. The fuzzy programs that are executed for detecting the driving situation with the detection circuit 30 are described further below.

Figure 2:
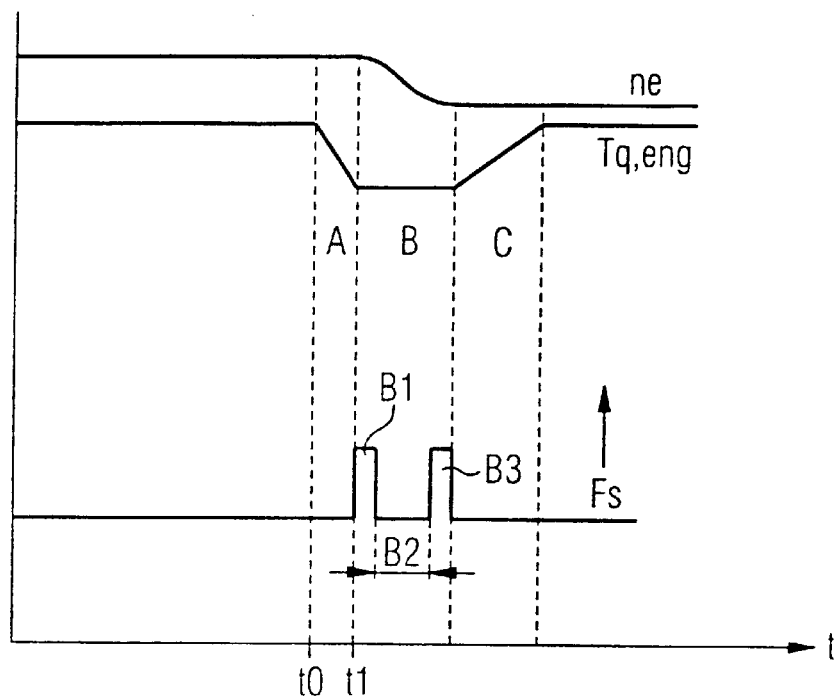
FIG. 2 shows the gear shift sequence during an upshift of the drive train controller shown in FIG. 1.

The force/travel profile or the force/time profile is characteristic of the execution of a gear speed shifting operation or transmission ratio change in a transmission. This is illustrated in FIG. 2 with an example of an automatic manual shift transmission (AMT transmission), specifically using the variables engine speed ne, engine torque Tq,eng and gear shifting force Fs. If an upshift is initiated at a time t0, during a phase A, the engine controller 2 reduces the engine torque Tq,eng until a time t1 while the engine speed ne remains unchanged.

Starting from the time t1, the current gear speed is disengaged during a time period or partial phase B1. During a time period B2, the gate arm in the transmission is changed if the respective gear speed change requires it. During a time period B3, the new gear speed is finally engaged and the synchronization of the transmission input shaft is completed. The engine torque Tq,eng is controlled in a mechanically decoupled way from this during phase B, which includes the time periods or partial phases B1 to B3, in such a way that the engine reaches the synchronous rotational speed of the new gear speed or target gear speed as precisely as possible. This can be carried out by predefining a target rotational speed with the transmission controller 3. Finally, in a phase C, the frictional engagement in the drive train is restored by engagement.

The sequence of the operations in the phases and time periods A, B1, B2, B3 and C is not rigid. The operations in the phases A and C for example—i.e. the release and restoration of the frictional engagement in the drive train—can be carried out both quickly, but in an uncomfortable way, and slowly, but with a longer interruption of the tractive force. In phase A, a certain prolongation is aimed at, not only because of the greater driving comfort that is associated with it, but also because of the lower exhaust emissions that can be achieved in this way. Given lower cutoff dynamics for the engine torque, it is possible to make exclusive use of what is referred to as the air path for cutting off (by simultaneously controlling the throttle valve position and the injection quantity in petrol engines). The alternative possibility of reducing or cutting off the engine torque by adjusting the ignition angle in the retarded direction, which leads to a poorer combustion and thus to more nitrogen oxides in the exhaust emissions, can thus be avoided.

The same applies to phase C, because here, too, a rapid build up of the engine torque would have to be carried out with an adjustment to the ignition angle.

The phase B procedure has a decisive influence on the overall gear shifting time—as do phases A and C—but also an influence on the service life of the transmission, in particular, the synchronizing unit of the transmission. High forces, especially in the subphase B3, load the mechanical components of the transmission considerably, in particular at the high forces that modern actuators can apply. These forces are a multiple of the forces that can be applied by hand in manually activated transmissions (for example up to 1000 N).

Figure 3:
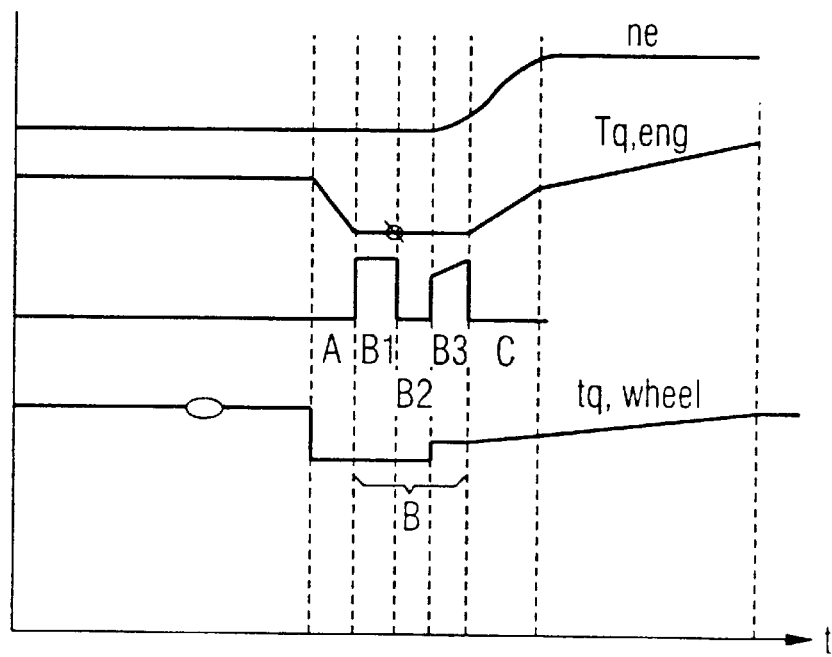
FIG. 3 shows the gear shift sequence during a downshift of the drive train controller shown in FIG. 1.

In the case of a gear shift operation with a smaller (dynamic) driving power request, the force profile is slowly adjusted to a relatively low level in subphase B3, but in a situation with a high driving power request, the actuation force for the clutch is adjusted to a high final value very quickly. An example of this is a 5–3 downshift at the start of an overtaking maneuver (See FIG. 3). In this example, the phases A and C are also severely shortened. However, short phases A and C restrict the gear shifting comfort greatly because both rapid removal of load and rapid loading of the drive train lead to oscillations that can become manifested as shaking.

A short gear shifting time also provides advantages when driving up inclines. For example, the drop in velocity that occurs, for example, as a result of the interruption of the tractive force when an automatic manual gear shift transmission (AMT) is shifted, is effectively reduced.

These explanations show the target conflicts that can occur when there is a completely rigid sequence of gear shift operations in an AMT and that are prevented by adaptively matching the changes of the transmission ratio to the driving situation. This matching occurs in the drive train controller shown in FIG. 1. Reliable functioning of a transmission can also only be ensured with certainty by such adaptive matching. In particular, in the case of downshifts under traction, the phases A to C should be kept as short as possible so that, for example, at the start of an overtaking operation, the necessary acceleration is available very quickly.

The gear shifting time can be shortened further by allowing the phases A to C to overlap. In this way, the old gear speed can already be partially disengaged in the subphase B1 although the declutching in phase A has not yet been terminated. Analogously, the gear speed actuator 48 does not need to have reached its end stop bit in phase B3 before the engagement is started again.

When a driving position (for example a forward driving position D or a reverse driving position R) is engaged from the idling position (N or neutral) of the transmission, as is the case, for example, during maneuvering and during reversing, gear shifting noises normally occur that are at least annoying. In subphase B2, and in particular in subphase B3, the gear shift change controller 26 ensures that the engagement of the new gear and the synchronization in the transmission are carried out with low forces, and thus in a somewhat prolonged fashion. This ensures that the aforementioned annoying noises are eliminated. In such driving situations, there is no need for strong accelerations of the vehicle. The same applies to gear shifting operations when traveling slowly.

Reliably detecting the current driving situation or driving maneuver is decisive for individually optimizing the drive train control in accordance with the criteria that are decisive in the respective situation. As a result of detecting the driving situation within the adaptive gear shifting strategy, which is implemented by the IPM controller 16, it is possible to classify the driving performance requirements not only in terms of their intensity, but also in terms of their dynamic demand.

Within the scope of the programs that are processed by the fuzzy logic computer or controller from European Patent Application EP 0 576 703 A1, the detection circuit 50 executes fuzzy logic programs as follows:

a first rule set "fast detection rules", which executes mean values or filtered values of sensor signals that correspond to the input variables given on the following page, and a second rule set "slow detection rules" which is capable of detecting rapid changes in the driving performance request.

Such rapid changes can be detected, for example, from specific accelerator pedal ranges that are obtained from typical accelerator pedal changes by the driver (instead of the accelerator pedal change, changes to the set point engine torque or to the setpoint wheel torque can also be considered). In this way, operations such as overtaking and rapid starting (at traffic lights), and also driving with a slight thrust up to a quantifiable braking intention can be reliably detected. In such cases, long gear shifting times are preferred for reasons of comfort.

The fuzzy logic program for the detection circuit 50 which can also be embodied as a subprogram within the IPM controller 16 is as follows:

Input variables:
Throttle opening
Throttle activity
Output speed
Throttle average
Diff. torque
Lateral acceleration
Slip of wheels
Output variables:
Load (mountain, plain, valley)
Driver (sporty, medium, defensive)
(Shift control)

These variables are evaluated for the adaptive clutch and transmission control, specifically with the following fuzzy rules:

Rule 1: IF Driver=sporty THEN Clutch engagement=Fast AND Shift forces=High

Rule 2: IF Driver=medium THEN Clutch engagement=Medium AND Shift forces=Medium

Rule 3: IF Driver=defensive THEN Clutch engagement=Slow AND Shift forces=Medium

Rule 4: IF Slip of wheels=High THEN Clutch engagement=Slow AND Shift forces=Medium Rule 5: IF Load=valley THEN Clutch engagement=Slow AND Shift forces=Medium Rule 6: IF Throttle speed=high THEN Clutch engagement=Slow AND Shift forces=High Expressed in words, these rules mean the following:

1. Sporty drivers wish to perform gear shift and clutch operations quickly.
2. Normal drivers wish to perform gear shift and clutch operations at a medium speed.
3. Restrained drivers wish to perform gear shift operations with a medium speed and clutch operations slowly.
4. If spinning of the drive wheels is detected, clutch operations should be performed slowly.
5. During downhill travel, the clutch is engaged slowly after the gear shift operation.
6. During rapid accelerator pedal movement (overtaking; starting at traffic lights), the clutch and gear shift operations are to be performed quickly.

The winter mode is also an operating mode of the motor vehicle in which a change in the transmission ratio that is matched adaptively to the driving situation is advantageous. In particular, downshifts will be carried out with a prolonged phase C, as is apparent from FIG. 3. The variables ne, Tq,eng and Fs that are illustrated plotted over time correspond to those in FIG. 2. In addition, the variation over time of the wheel torque tq,wheel is illustrated. A buildup in the wheel torque tq,wheel that is increased by downshifting must take place more slowly over time so that sudden spinning of the driven wheels is avoided. This is achieved by means of a correspondingly slow increase in the clutch torque and the engine torque, and this makes it possible for the driver to adjust to the increased wheel torque. By reference to the signals of the wheel speed sensors, a wheel slip is detected and the presence of wintry road conditions is concluded. The winter operation has priority over a rapid buildup in the wheel torque tq,wheel in driving performance-oriented situations. The winter mode function is necessary both in a manual gear shifting mode of the transmission and in an automatic mode (i.e. when gear shift operations are carried out completely automatically).

Figure 4:
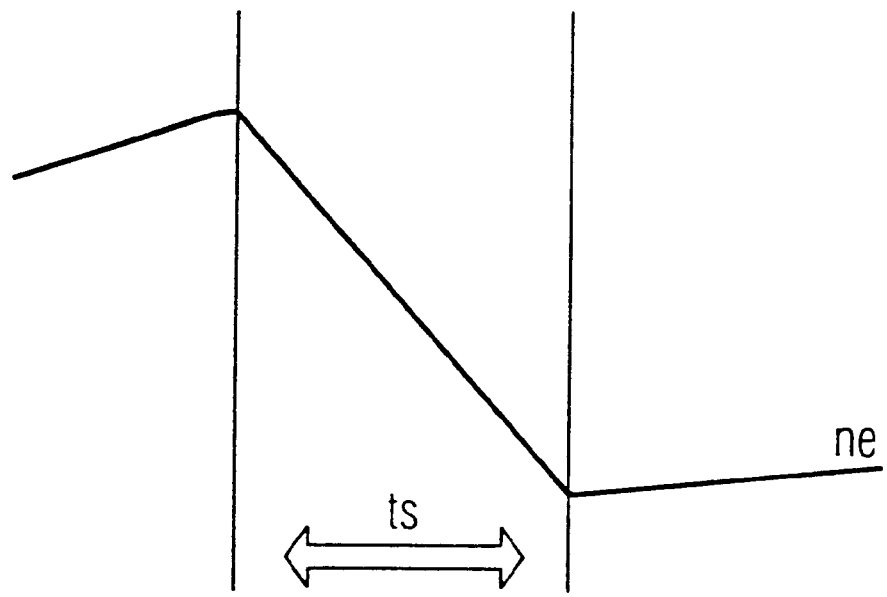
FIG. 4 shows the gear shift sequence in a continuously variable transmission that is operated in the step-by-step variable shift mode.

The change in the transmission ratio that is described above and that is adaptively matched to the driving situation is also used analogously in continuously variable transmissions (CVTs). In a step-by-step variable mode of a continuously variable transmission, the respective shifting time ts (FIG. 4) can be controlled in such a way that an adverse effect on driving safety is prevented, i.e. the gear shifting time ts is prolonged when there are low coefficients of friction of the underlying surface.

The adjustment dynamics are expediently generally limited in such a way that there is not a risk of the adjustment process itself representing a hazard. This is particularly important in vehicles that do not have a traction controller. Outside of a gear shifting operation, a strategy for adapting the transmission ratio to the driving situation is generally applied. This strategy keeps the motor vehicle in a stable driving state. Moreover, all of the rules that have been explained above for an AMT also appropriately apply.

When there is a high dynamic driving performance request in a CVT—even in a continuously variable mode— the transmission is adjusted quickly, and the adaptation to the driving situation is carried out using fuzzy logic rules. A sporty driver evaluation also generally results in rapid adjustment to the transmission ratio in a virtual step-by-step mode of the transmission controller.

We claim:

1. A drive train controller of a motor vehicle having an automatic transmission and an engine providing a torque, the drive train controller comprising:

an engine controller for controlling variables that influence the torque of the engine; and a transmission controller for controlling gear shifting operations of the automatic transmission, said transmission controller exchanging data with said engine controller, the data enabling the gear shifting operations to be performed comfortably;

said transmission controller including a gear shift change controller for correcting a requested engine torque during a gear shifting operation;

said transmission controller including a detection circuit for determining a driving situation of the motor vehicle; and said transmission controller adaptively matching changes in a transmission ratio to dynamics of a feature selected from the group consisting of the driving situation that has been determined and driver characteristics.

2. The drive train controller according to claim 1, comprising:

a gear shift controller that is embodied as a fuzzy logic circuit;

said gear shift controller defining a gear shift strategy of a drive train of the motor vehicle.

3. The drive train controller according to claim 2, wherein said detection circuit is a component of said gear shift controller.

4. The drive train controller according to claim 3, comprising a clutch controller receiving information, relating to a respective driving strategy and to the driving situation, from said gear shift controller.

5. The drive train controller according to claim 4, comprising a line connecting said gear shift change controller to said clutch controller to coordinate said clutch controller with a gear shift operation.

6. The drive train controller according to claim 5, comprising:

a plurality of transmission actuators connected to said gear shift change controller;

said plurality of said transmission actuators being selected from the group consisting of electromechanical transmission actuators and electrohydraulic transmission actuators.

7. The drive train controller according to claim 5, wherein said gear shift change controller engages a new gear speed and synchronizes the transmission with low forces when changing from an idling position of the transmission into a driving position of the transmission.

8. The drive train controller according to claim 2, wherein said gear shift controller executes a fuzzy logic program including:

a first rule set that uses values selected from the group consisting of mean values of sensor signals and filtered values of sensor signals; and a second rule set for detecting rapid changes in a driving performance request.

9. The drive train controller according to claim 2, comprising a clutch controller receiving information, relating to a respective driving strategy and to the driving situation, from said gear shift controller.

10. The drive train controller according to claim 9, comprising a line connecting said gear shift change controller to said clutch controller to coordinate said clutch controller with a gear shift operation.

11. The drive train controller according to claim 10, comprising:

a plurality of transmission actuators connected to said gear shift change controller;

said plurality of said transmission actuators being selected from the group consisting of electromechanical transmission actuators and electrohydraulic transmission actuators.

12. The drive train controller according to claim 9, wherein said gear shift change controller engages a new gear speed and synchronizes the transmission with low forces when changing from an idling position of the transmission into a driving position of the transmission.

* * * * *